United States Patent [19]
Lehto

[11] Patent Number: 5,970,745
[45] Date of Patent: Oct. 26, 1999

[54] METHOD FOR STOPPING A GLASS PANEL CONVEYED FROM A FURNACE INTO A TEMPERING STATION OR A BENDING AND TEMPERING STATION

[75] Inventor: Esko Lehto, Kangasala, Finland

[73] Assignee: Tamglass Ltd. Oy, Tampere, Finland

[21] Appl. No.: 09/089,239

[22] Filed: Jun. 2, 1998

[30] Foreign Application Priority Data

Jun. 3, 1997 [FI] Finland ................................ 972351

[51] Int. Cl.⁶ ..................... C03B 23/023; C03B 27/00; C03B 35/16
[52] U.S. Cl. ................ 65/17.1; 65/104; 65/106; 65/114
[58] Field of Search .................. 65/17.1, 102, 111, 65/106, 107, 104, 114, 118, 163, 287, 273, 268, 348, 370.1; 198/617, 577, 792; 432/121; 271/3.14, 8.1

[56] References Cited

U.S. PATENT DOCUMENTS

| | | |
|---|---|---|
| 4,204,853 | 5/1980 | Seymour . |
| 4,470,835 | 9/1984 | Fecik et al. . |
| 4,501,603 | 2/1985 | Frank et al. . |
| 4,586,946 | 5/1986 | Kramer et al. . |
| 4,589,901 | 5/1986 | Yoshizawa et al. . |
| 4,822,398 | 4/1989 | McMaster et al. . |
| 4,881,962 | 11/1989 | Reunamaki et al. . |
| 4,985,059 | 1/1991 | Letemps et al. . |
| 5,057,137 | 10/1991 | Reunamaki et al. . |
| 5,066,321 | 11/1991 | Kramer et al. . |
| 5,096,478 | 3/1992 | Kramer et al. . |
| 5,286,271 | 2/1994 | Rueter et al. . |
| 5,443,609 | 8/1995 | Lehto . |

*Primary Examiner*—Steven P. Griffin
*Attorney, Agent, or Firm*—Burns, Doane, Swecker & Mathis, L.L.P.

[57] ABSTRACT

The invention relates to a method for stopping a glass panel conveyed from a furnace into a tempering station or a bending and tempering station. In the method, a glass panel is carried upon rolls and pressed by means of overhead press rollers, as the conveying speed of the rollers is decelerated for stopping the glass panel. Over a deceleration distance, the rate of deceleration is within the range of 0.6–3 m/s². By virtue of the overhead press rollers, the rate of deceleration can be increased, such that the glass exit speed from a furnace can be raised and, at the same time, the glass cooling time can be minimized prior to a tempering process.

15 Claims, 1 Drawing Sheet

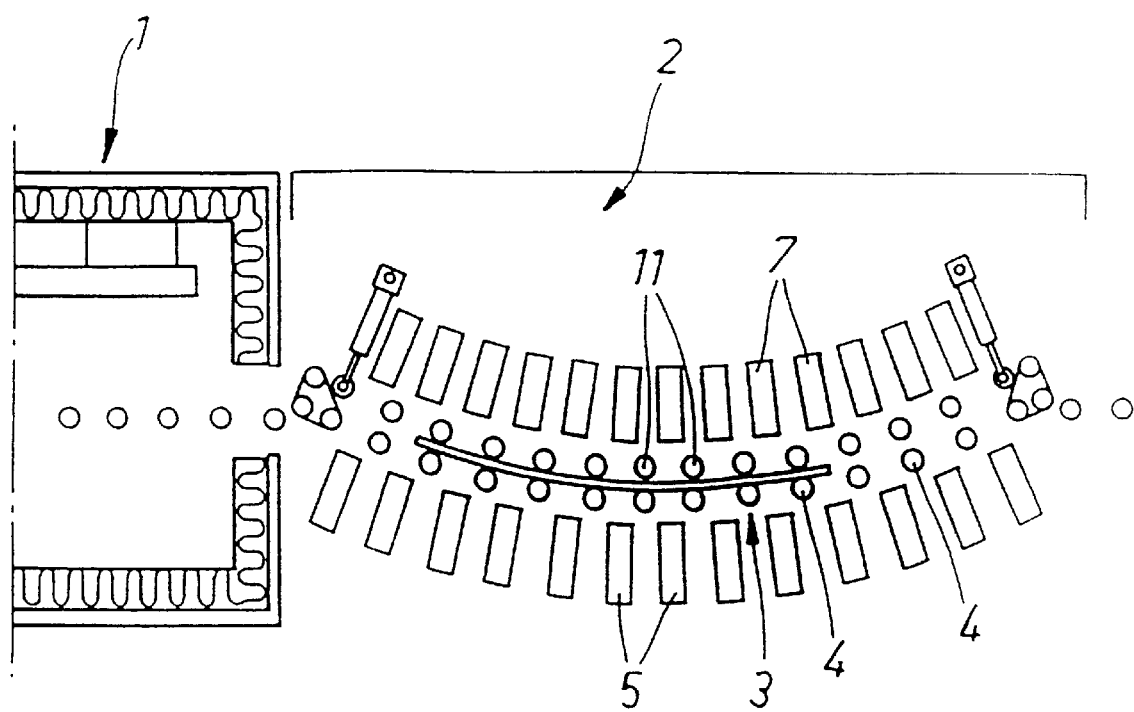

METHOD FOR STOPPING A GLASS PANEL CONVEYED FROM A FURNACE INTO A TEMPERING STATION OR A BENDING AND TEMPERING STATION

FIELD OF THE INVENTION

The present invention relates to a method for stopping a glass panel or sheet conveyed from a furnace into a tempering station or a bending and tempering station, in which method a glass panel is carried upon rolls and pressed by means of overhead press rollers, as the conveying speed of the rollers is decelerated for stopping the glass panel.

BACKGROUND OF THE INVENTION

In prior known methods, if the glass has an exit speed from a furnace of more than 800 mm/s, the deceleration distance will be more than 640 mm and the deceleration time 1.6 seconds or more. This is due to the fact that the deceleration of glass carried on rolls must be maintained at or below 0.5 m/s$^2$, otherwise slippage occurs between the glass and the rolls, resulting in marks on the glass. Since the conveyance and deceleration sequence becomes relatively long, typically in excess of 2 seconds, the leading edge of the glass will have time to cool before bending and/or tempering can be started. The cooling can be offset by overheating the glass in the furnace, but the consequence of overheating is an increased susceptibility to various optical flaws.

SUMMARY OF THE INVENTION

An object of the invention is to provide a method, whereby a glass panel can be stopped in a tempering station or a bending and tempering station quickly at a high rate of deceleration.

In order to achieve this object, the basis of the invention is the use of overhead press rollers, whereby the decelerating force can be increased without a glass slippage hazard. The Applicant's patent publication U.S. Pat. No. 5,443,609 discloses a more detailed description of press rollers, whose pressure force is individually regulable. The present invention can just as well be implemented with press rollers, whose pressure force is evenly distributed, without a possibility of individual adjustment.

When using overhead press rollers, it is possible to stop a conveying speed of more than 800 m/s over a deceleration distance of less than 640 mm. Thus, the stopping time falls short of 1.6 seconds.

By raising the exit speed and by increasing the rate of deceleration, the total cooling time that the leading edge of glass is exposed to can be reduced to even less than 1 second.

BRIEF DESCRIPTION OF THE DRAWING FIGURE

The features associated with the present invention will become more apparent from the following detailed description considered with reference to the accompanying drawing FIGURE which is a plan view of the downstream end of a furnace.

DETAILED DESCRIPTION OF THE INVENTION

In order to describe the invention in more detail, reference is made to the accompanying drawing, which shows the downstream end of a furnace 1, and a bending and tempering station 2 linked therewith for carrying out the method of the invention. A glass panel is conveyed forward carried by a conveyor 3 formed of rolls 4 and pressed by overhead press rollers 11. The tempering station 2 includes lower tempering air boxes 5 and upper tempering air boxes 7. In the depicted case, the glass panel is bent during the course of deceleration action. The deceleration action is started when the leading glass edge is a deceleration distance away from the downstream end of the bending and tempering station 2. A program controlling the speed of the roll conveyor 4 begins calculating the necessary rate of deceleration as the leading glass edge is such a distance away from its end position that the motion can be stopped exactly at the end position within a minimal time. Factors having an effect on the calculation include a.o. the glass exit speed from a furnace, i.e. a speed at which the deceleration action is started, as well as alteration of the rate of deceleration during the decelerating action. The exit speed may be different on glasses that are different in terms of the size and thickness as well as other characteristics thereof. The aim is an exit speed of about 1–1.5 m/s. On the other hand, the decelerating force or rate of deceleration can be increased over a decelerating distance, whereby the strongest decelerating force only has an effect on the glass over a very short distance, as the speed of glass has already slowed down.

When the deceleration is effected as described above, the tempering process can also be started in a minimal time. In most cases, the decelerating action can be performed over a distance of less than 0.5 m within a time of less than 0.5 second. When the bending of a glass panel is started immediately upon receiving the trailing glass edge in the bending and tempering station, the tempering process can be started in a minimal time, which in turn makes it possible for the glass to come out of the furnace at a colder temperature, whereby it is possible to tolerate higher frictional forces between the glass and the rolls 4 as well as higher pressure forces between the glass and the rollers 11. In a method of the invention, the rate of deceleration is typically within a range of 0.6–3 m/s$^2$. Although the exit speed from a furnace varies as a result of variations in the size and other such characteristics of glass, such speed is nevertheless preferably in excess of 800 mm/s in order not to spend an unduly amount of time for conveying the glass to the point of starting the decelerating action.

I claim:

1. A method for stopping a glass panel conveyed from a furnace into a tempering station or a bending and tempering station, comprising carrying a glass panel upon rolls and pressing the glass panel by overhead press rollers, as a conveying speed of the rolls is decelerated for decelerating and stopping the glass panel, wherein over a deceleration distance a rate of deceleration of the glass panel is within the range of 0.6–3 m/s$^2$.

2. A method as set forth in claim 1, wherein a decelerating force and the rate of deceleration are increased over the deceleration distance.

3. A method as set forth in claim 2, wherein the deceleration distance is less than 0.5 m.

4. A method as set forth in claim 2, wherein the deceleration of the glass panel is started at a conveying speed which is in excess of 800 mm/s.

5. A method as set forth in claim 2, wherein the deceleration of the glass panel is started as a leading edge of the glass panel is said deceleration distance away from a downstream end of the tempering station or the bending and tempering station.

6. A method as set forth in claim 2, wherein the glass panel is bent during the deceleration of the glass panel.

7. A method as set forth in claim 1, wherein the deceleration distance is less than 0.5 m.

8. A method as set forth in claim 7, wherein the deceleration of the glass panel is started at a conveying speed which is in excess of 800 mm/s.

9. A method as set forth in claim 7, wherein the deceleration of the glass panel is started as a leading edge of the glass panel is said deceleration distance away from a downstream end of the tempering station or the bending and tempering station.

10. A method as set forth in claim 7, wherein the glass panel is bent during the deceleration of the glass panel.

11. A method as set forth in claim 1, wherein the deceleration of the glass panel is started at a conveying speed which is in excess of 800 mm/s.

12. A method as set forth in claim 11, wherein the glass panel is bent during the deceleration of the glass panel.

13. A method as set forth in claim 1, wherein the deceleration of the glass panel is started as a leading edge of the glass panel is said deceleration distance away from a downstream end of the tempering station or the bending and tempering station.

14. A method as set forth in claim 13, wherein the glass panel is bent during the deceleration of the glass panel.

15. A method as set forth in claim 1, wherein the glass panel is bent during the deceleration of the glass panel.

* * * * *